(12) United States Patent
Biller

(10) Patent No.: US 6,918,322 B1
(45) Date of Patent: Jul. 19, 2005

(54) MULTIPLE SCREW DRIVING MACHINE

(75) Inventor: Sven-Olov Biller, Hudiksvall (SE)

(73) Assignee: Iggesund Tools AB

( * ) Notice: Subject to any disclaimer, the term of this patent is extended or adjusted under 35 U.S.C. 154(b) by 0 days.

(21) Appl. No.: 09/979,016

(22) PCT Filed: May 11, 2000

(86) PCT No.: PCT/SE00/00933

§ 371 (c)(1),
(2), (4) Date: Mar. 25, 2002

(87) PCT Pub. No.: WO00/73015

PCT Pub. Date: Dec. 7, 2000

(30) Foreign Application Priority Data

May 19, 1999 (SE) ............................................... 9901802

(51) Int. Cl.[7] ............................................ B25B 23/02
(52) U.S. Cl. ..................... 81/57.22; 81/57.14; 81/57.36
(58) Field of Search ............................. 81/57.14, 57.22, 81/57.3, 57.36

(56) References Cited

U.S. PATENT DOCUMENTS

| | | | | |
|---|---|---|---|---|
| 2,978,936 A | * | 4/1961 | Orner ........................ | 81/57.22 |
| 3,805,645 A | * | 4/1974 | Jenny ........................ | 81/57.22 |
| 5,277,085 A | * | 1/1994 | Tanimura et al. .......... | 81/57.22 |
| 6,134,989 A | * | 10/2000 | Stevens ..................... | 81/57.22 |

* cited by examiner

*Primary Examiner*—James G. Smith
(74) *Attorney, Agent, or Firm*—Fitzpatrick, Cella, Harper & Scinto

(57) ABSTRACT

The invention relates to a multiple screw driving machine comprising a plurality of individual screwdrivers which are arranged on a body or in a housing (8) and which each comprise a spindle or shaft (7) which is rotatably mounted in the housing and which at an outer front end carries a screw driving tool (10) for engagement with a screw means. Each of the screwdrivers are separately drivable by a common motor (1) via a driving wheel transmission comprising a primary driving wheel (5) for each screwdriver. The primary driving wheel (5) is rotatably but non-displaceably mounted on the shaft (7) of the respective screwdrivers whereas a driver element (14) is non-rotatably but displaceably mounted on the shaft (7) and is displaceable with the aid of an operating means (16) towards and away from the primary driving wheel (5). The primary driving wheel (5) and the driver element (14) each have mating and mutually facing engagement means (19, 20).

3 Claims, 2 Drawing Sheets

MULTIPLE SCREW DRIVING MACHINE

Figure 1:
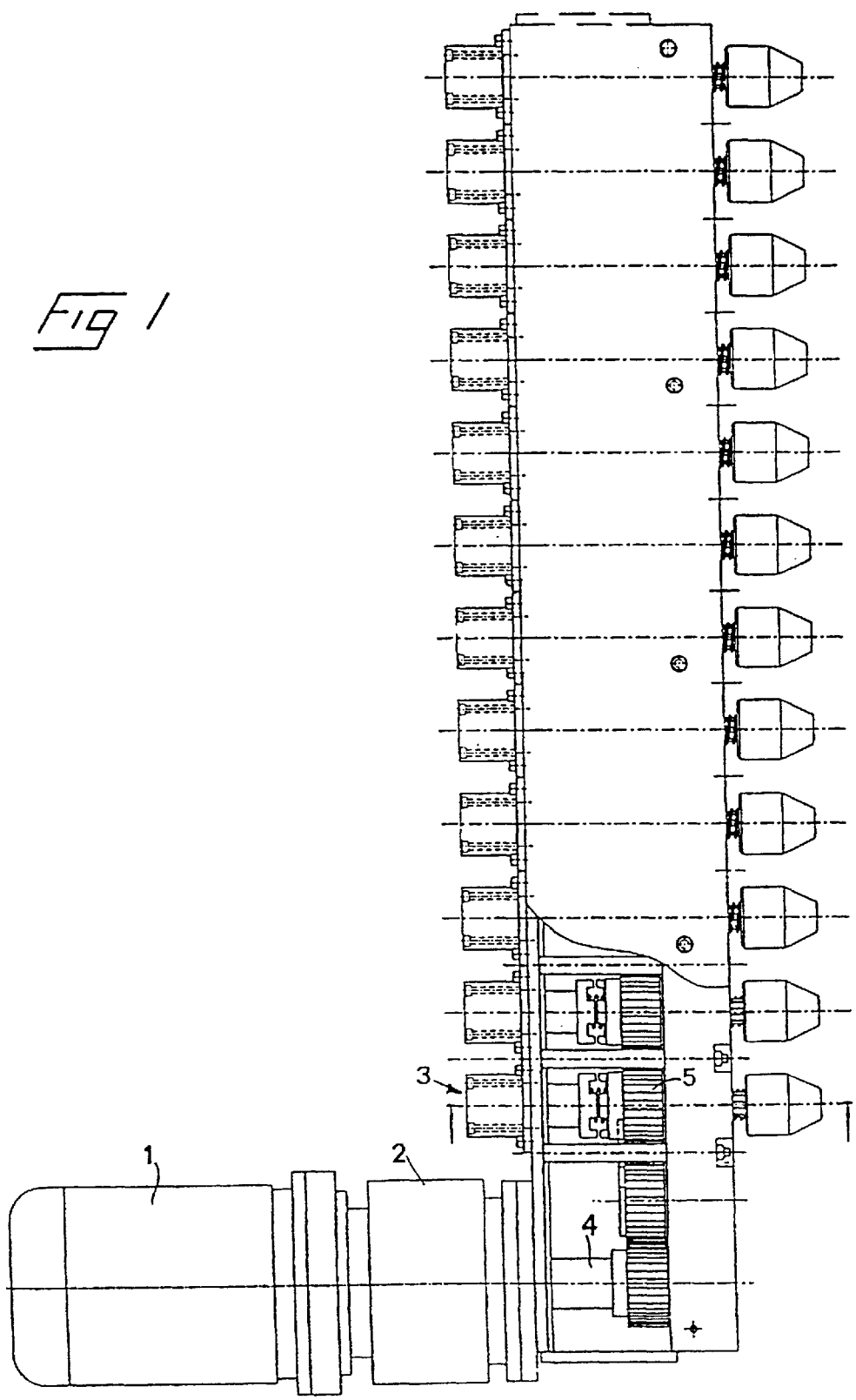

The present invention relates to a multiple screw driving machine comprising a plurality of individual screwdrivers which are arranged on a body or in a housing and which each comprise a spindle or shaft which is rotatably mounted in the housing and which at an outer front end carries a screw driving tool for engagement with a screw means, each of the screwdrivers being separately drivable by a common motor via a driving wheel transmission comprising a primary driving wheel for each screwdriver, said primary driving wheel being rotatably mounted on the shaft of the screwdriver.

BACKGROUND OF THE INVENTION

Multiple screw driving machines are previously well known in the art and it is also well known to arrange the individual screwdrivers included in the multiple screw driving machine to be separately drivable independently of each other. This is desirable in order to be able, for instance, to tighten the screws in a screw joint in a certain order. Such a multiple screw driving machine is fairly easy to accomplish by providing each individual screwdriver with a separate motor which can be, for instance, electrically, pneumatically or hydraulically driven. As a result, it is possible to tighten and loosen the screws in the desired order by successively driving the motors associated with the respective screwdrivers. Such a multiple screw driving machine is known, for instance, from DE 2 112 907.

However, in order to reduce the cost of the multiple screw driving machine and also the space required for each individual screwdriver it is also desirable to provide driving by means of one common motor. By optional connection and disconnection of the driving connection of the respective screwdrivers, it is possible to drive an arbitrary number of the screwdrivers in an arbitrary order.

SE 456,072 discloses a multiple screw driving machine of the kind mentioned by way of introduction. It has one common motor which drives a centrally mounted driving shaft. The individual screwdrivers are distributed around the driving shaft, and the drive connection or drive transmission between the driving shaft and the individual screwdrivers is provided by a gear wheel which is arranged for each screwdriver and which is, on the one hand, rotatably arranged on the shaft of the screwdriver and, on the other, displaceable in the longitudinal direction along the same. The gear wheel is continuously engaged with a non-rotatable gear rim arranged on the driving shaft, and thus the gear wheel of all the screwdrivers will rotate as soon as the driving shaft rotates. At one end of the respective gear wheels, there are engagement means which can engage mating engagement means which are arranged on a circumferential flange on the screwdriver shaft when the gear wheel is moved to a front end position, and then the screwdriver shaft is drivingly connected with the driving shaft. On the other hand, when the gear wheel is moved to a rear end position the engagement means are not engaged with each other and the screwdriver shaft is not drivingly connected with the driving shaft but is idle even if the driving shaft and consequently also the gear wheel rotate. The operation of the gear wheel between the rear and the front end positions is ensured with the aid of a pneumatic operating means which is arranged parallel to and on the outside of the respective screwdrivers and which engages the gear wheel by means of a fork-shaped element in a circumferential groove in the gear wheel. This multiple screw driving machine suffers from a number of drawbacks. It requires, among other things, an expensive and complicated construction for the gear wheel to be rotatable about the respective screwdriver shafts and displaceable in the longitudinal direction in relation to the same. Furthermore, the multiple screw driving machine is limited by the individual screwdrivers being distributed about the driving shaft to allow the respective gear wheels to directly engage the gear rim on the driving shaft. Thus it would not be possible to tighten a screw joint in which the screws are placed, for instance, in a straight line. In addition, the operating means is arranged on the side of the respective screwdrivers and parallel to their respective shafts, which requires a great deal of space and may constitute an obstacle when the available space is small.

SUMMARY OF THE INVENTION

One object of the present invention is to provide a multiple screw driving machine in which the individual screwdrivers are separately drivable by means of one common motor and which is also simple, inexpensive and compact with respect to its length but in particular to its width, which makes it possible to work with screw joints in which the screws are very closely spaced. Another object of the invention is to provide a multiple screw driving machine which is constructed in a flexible manner and therefore relatively simple to adjust to screw joints with different screw spacing and also to screw joints having different shapes, such as circular, linear and also non-symmetrically shaped screw joints. At least these objects are achieved by means of a multiple screw driving machine according to claim 1.

Thus the invention is based on the understanding that the above objects can be achieved by providing a primary driving wheel which is included in a driving wheel transmission and driven by a motor and which is rotatably but non-displaceably mounted on each screwdriver shaft whereas a driver element is non-rotatably but displaceably arranged on the same shaft and displaceable with the aid of an operating means towards and away from the primary driving wheel. In an engagement position, when the driver element is situated near the primary driving wheel, mutually facing mating engagement means on the driver element and the primary driving wheel are engaged with each other and a rotary motion is transmissible from the primary driving wheel via the driver element to the screwdriver shaft. However, in a disconnected position, when the driver element is spaced apart from the primary driving wheel, the screwdriver shaft is in a non-driven state even if the primary driving wheel rotates.

In a preferred embodiment which is shown and described in an embodiment below, the driving wheel transmission comprises gear wheels which are engaged with each other. In certain applications, for instance, when the required tightening torque is not very great, it could however be possible to use, instead of gear wheels, essentially smooth rubber or plastic wheels which are in contact with each other and between which a rotary motion is transmitted by friction.

One reason why the individual screwdrivers can have a compact size is that the primary gear wheel and the driver element are concentrically placed on the screwdriver shaft. Admittedly, it would be feasible to arrange the operating means on the side of the screwdriver shaft but it is preferred from considerations of space to place also this means concentrically with the screwdriver shaft or in its longitudinal extension and preferably at the rear end of the screwdriver shaft which end is spaced apart from the screw driving tool.

The function and the operation of the operating means can vary. The operating means can, for instance, be electrically, pneumatically or hydraulically driven. In the preferred embodiment of the multiple screw driving machine which is shown in the drawings, the operating means is single-acting, i.e. it actively displaces the driver element into the engagement position whereas the disconnection is accomplished by means of a counter-acting spring which displaces the driver element away from the primary gear wheel when the operating means is in a non-activated state. However, the reverse could also be feasible and also to use a double-acting operating means and omit the spring.

In a preferred embodiment, the driver element is displaceable along splines on the screwdriver shaft. However, many other types of connections could be feasible which permit a displacement along the screwdriver shaft but prevent rotation about the same. It could, for instance, be possible to have projecting pins running in grooves at the inside of a bore in the driver element or in the screwdriver shaft.

In the preferred embodiment, the screwdrivers are connected in series in a straight line and the rotary motion is transmitted from the motor via intermediate secondary gear wheels between each screwdriver. As a result, it is easy to adjust the mutual spacing and the position of the screwdrivers to the intended use. The screwdrivers only need to be placed in the desired positions and the intermediate secondary gear wheels only need to be adjusted to the spacing distances.

It goes without saying that the invention may be applied in many different ways within the scope of the appended claims. The order of the connection and the disconnection, respectively, of the individual screwdrivers may, for instance, be performed manually or via an electronic control system. In large bolt joints, two or more multiple screw driving machines according to the present invention could also be integrated in a common housing and controlled via a common control system to allow tightening and loosening, respectively, of two or more bolts at the same time, without a risk of an overload of the motor.

BRIEF DESCRIPTION OF THE ACCOMPANYING DRAWINGS

Figure 2:
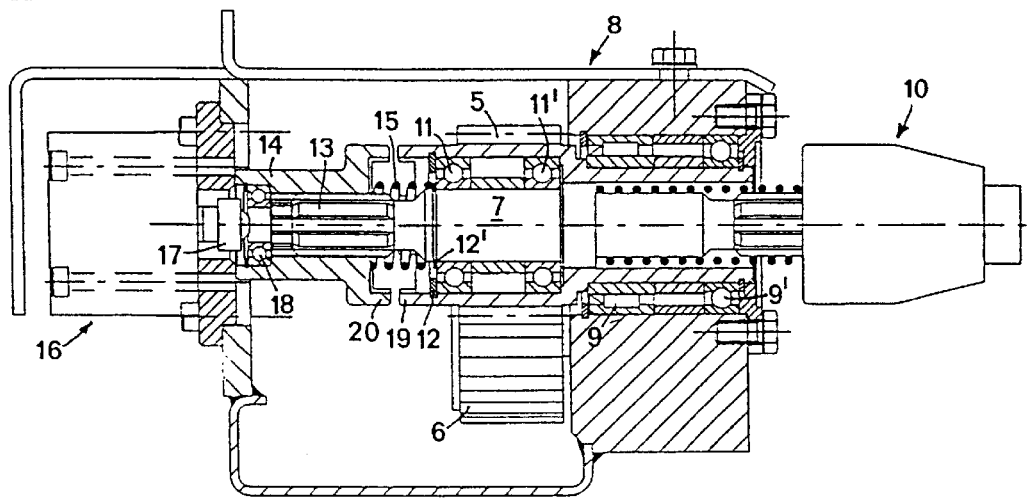
Figure 3:
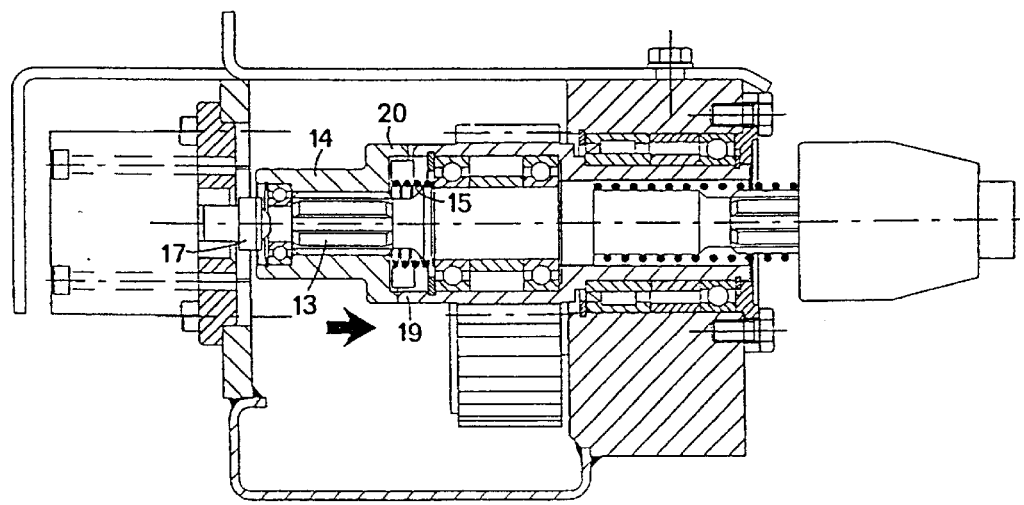

In the drawings:

FIG. 1 is a plan view partially in cross-section of a multiple screw driving machine according to the present invention, FIG. 2 is a vertical cross-section of an individual screwdriver which is included in the multiple screw driving machine of FIG. 1 and which is in a disconnected state, and FIG. 3 corresponds to FIG. 2 but is in a connected state.

DETAILED DESCRIPTION OF A PREFERRED EMBODIMENT OF THE INVENTION

Reference is first made to FIG. 1 which in a partially cross-sectional plan view shows a preferred embodiment of a multiple screw driving machine according to the present invention. It comprises an electrically driven motor 1, a gear casing 2 and a plurality of individual screwdrivers 3 which are arranged in series. The screwdrivers are driven by the motor 1 via an output shaft 4 and a gear wheel transmission, which comprises primary gear wheels 5 and secondary gear wheels 6 which are located between the same.

The construction of an individual screwdriver is also described in more detail in FIGS. 2 and 3 which show vertical cross-sections of an individual screwdriver in a disconnected and a connected state, respectively. As apparent, the screwdriver is accommodated in a housing 8 and comprises a screwdriver shaft 7 which is rotatably mounted in the body of the housing by means of ball bearings 9, 9'. At the outer front end of the screwdriver shaft, there is a screw driving tool 10 in the form of a screw socket for hexagonal bolts. The primary gear wheel 5 is rotatably mounted on an intermediate part of the screwdriver shaft by means of two ball bearings 11. It is, however, ensured that the gear wheel 5 is non-displaceable on the screwdriver shaft by the provision of retaining rings 12, 12' which are situated in grooves formed on the inside of the gear wheel and the outside of the screwdriver shaft, respectively.

In the area behind the primary gear wheel, the screwdriver shaft is provided with a male portion 13 of splines. A driver element 14 in the form of a socket having a female portion of the splines at the inside of a through-going cover is displaceably arranged on the male portion. The driver element 14 is thus non-rotatable but displaceable in relation to the screwdriver shaft. Between the primary gear wheel 5 and the driver element 14, there is a helical pressure spring 15 which tends to press the driver element away from the primary gear wheel.

Reference numeral 16 generally refers to a pneumatically driven operating means of which are shown only an outer sleeve and a pin 17 which is located at the end of a pneumatic piston. The pin 17 abuts against the rear end of the driver element 14 by means of a ball bearing 18.

The mutually facing ends of the primary gear wheel 5 and the driver element 14, respectively, are provided with mating engagement means in the form of protruding pins 19 and 20, respectively. In the preferred embodiment, the primary gear wheel and the driver element each have four pins (of which only two are shown in the Figures) which project parallel to and are located on the same radius from the axis of rotation. The distance between the pins is considerably greater than the width of the pins and therefore the engagement of the driver element with the primary gear wheel takes place with ample play.

During the operation of the motor 1, a rotary motion is transmitted to the gear wheel transmission. In a disconnected state of an individual screwdriver, such as shown in FIG. 2, the primary gear wheel 5 and the secondary gear wheel 6 will thus rotate whereas the screwdriver shaft 7 does not move. When the operating means 16 is activated, the pin 17 will be displaced forwards and the driver element will be displaced forwards on the splines shaft 13 against the action of the spring 15 so that the engagement means or engagement pins 19, 20 on the primary gear wheel 5 and the driver element 14, respectively, will engage with each other. This engagement position or connected position is illustrated in FIG. 3. The rotary motion from the primary gear wheel 5 is then transmitted via the driver element 14 to the screwdriver shaft 7 and the screwdriver can tighten or loosen a screw or a nut. This engagement position is maintained as long as the operating means 16 is activated. As soon as the operating means is deactivated, the spring 15 will press the driver element 14 backwards and the screwdriver returns to the disconnected position in FIG. 2.

What is claimed is:

1. A multiple screw driving machine comprising a plurality of individual screwdrivers which are arranged on a body or in a housing (8) and which each comprise a spindle or shaft (7) which is rotatably mounted in the housing and which at an outer front end carries a screw driving tool (10) for engagement with a screw means, each of the screwdrivers being separately drivable by a common motor (1) via a driving wheel transmission comprising a primary driving wheel (5) for each screwdriver, said primary driving wheel being rotatably mounted on the shaft (7) of the screwdriver, characterised in that the primary driving wheel (5) is non-displaceably mounted on the shaft (7) whereas a driver element (14) is non-rotatably but displaceably mounted on the shaft (7) and is displaceable with the aid of an operating means (16) towards and away from the primary driving wheel (5), the primary driving wheel (5) and the driver element (14) each having mating and mutually facing engagement means (19, 20) which are engaged with each other when the driver element (14) is displaced towards the primary driving wheel (5) whereas they are disconnected from each other when the driver element is spaced apart from the primary driving wheel, and that two adjacent primary driving wheels (5) are interconnected in series by at least one intermediate secondary driving wheel (6).

2. A multiple screw driving machine as claimed in claim 1, characterised in that the driver element (14) is placed in the direction backwards from the primary driving wheel (5).

3. A multiple screw driving machine as claimed in claim 1 or 2, characterised in that the operating means (16) is placed in the direction backwards from the driver element (14).

\* \* \* \* \*